US010902569B2

(12) United States Patent
Worthington

(10) Patent No.: US 10,902,569 B2
(45) Date of Patent: Jan. 26, 2021

(54) EFFICIENT FILTERING OF DIGITAL IMAGES

(71) Applicant: Adobe Inc., San Jose, CA (US)

(72) Inventor: John Worthington, Minnetonka, MN (US)

(73) Assignee: ADOBE INC., San Jose, CA (US)

(*) Notice: Subject to any disclaimer, the term of this patent is extended or adjusted under 35 U.S.C. 154(b) by 227 days.

(21) Appl. No.: 15/463,602

(22) Filed: Mar. 20, 2017

(65) Prior Publication Data
US 2018/0268530 A1 Sep. 20, 2018

(51) Int. Cl.
G06K 9/00 (2006.01)
G06T 5/40 (2006.01)
G06T 5/00 (2006.01)

(52) U.S. Cl.
CPC .............. G06T 5/40 (2013.01); G06T 5/001 (2013.01); G06T 2207/20028 (2013.01)

(58) Field of Classification Search
CPC .. G06T 5/40; G06T 5/001; G06T 2207/20028
USPC .................................................. 382/168–172
See application file for complete search history.

(56) References Cited

U.S. PATENT DOCUMENTS

| 2008/0298680 | A1* | 12/2008 | Miller | G06T 5/008 382/168 |
| 2010/0310168 | A1* | 12/2010 | Kass | G06T 7/44 382/168 |
| 2013/0127894 | A1* | 5/2013 | Cox | G09G 5/02 345/589 |
| 2015/0186464 | A1* | 7/2015 | Seputis | G06F 16/24545 707/718 |

* cited by examiner

Primary Examiner — Andrew M Moyer
(74) Attorney, Agent, or Firm — Keller Jolley Preece

(57) ABSTRACT

The present disclosure covers systems and methods of efficiently filtering digital images. More particularly, the present disclosure covers systems and methods that generate and maintain a list of unique pixel values within a kernel window. Using the list, the systems and methods determine filtered pixel values for a filtered output image by processing only the counts of pixels in the histogram associated with the unique pixel values of the list. By considering selective pixel values of the histogram based on the unique pixel values of the list, the systems and methods reduce computations as part of the filtering process.

20 Claims, 9 Drawing Sheets

EFFICIENT FILTERING OF DIGITAL IMAGES

BACKGROUND

Digital image processing often involves various filtering operations. Filtering techniques allow for various modifications to digital images including de-noising, texture editing, relighting, managing tone, demosaicking, stylizing, and other types of modifications. For example, bilateral filtering generally involves determining new pixel values for the filtered image by analyzing box-shaped regions of a digital image and determining weighted pixel values based on pixel values of the pixels within the box-shaped regions. Conventional bilateral filters typically calculate weighted pixel values by systematically looping through each pixel of a box-shaped region and adjusting weights based on values of the pixels. Determining weighted pixel values by systematically analyzing each pixel in conjunction with any number of neighboring pixels, however, becomes computationally prohibitive, particularly for high-resolution images.

Many conventional filters attempt to reduce the number of iterative calculations by utilizing histograms which track pixels and pixel values in a box-shaped region. In particular, some filters utilize histograms that track overlapping values of neighboring regions, thus reducing the total number of calculations needed to determine weighted pixels. Nevertheless, while histograms improve filtering techniques, histograms can become prohibitively large and still result in computationally expensive calculations as part of the filtering process. In particular, conventional histogram-based filtering methods process/iterate over each pixel value within the histogram. As 16-bit images can include up to 65,536 pixel values, iterations involved in some conventional filtering processes are time and computationally taxing.

These and other problems exist with regard to filtering digital images.

SUMMARY

Embodiments of the present disclosure provide benefits and/or solve one or more of the foregoing and other problems in the art with systems and methods that improve upon conventional filtering processes by reducing computations and speeding up the filtering process. In particular, the systems and methods intelligently perform histogram-based filtering by processing a subset of histogram entries rather than all histogram entries. More specifically, the systems and methods determine filtered pixel values in a manner that avoids processing some or all of the entries in a histogram with a zero count. By selectively considering entries of the histogram, the systems and methods reduce computations and speed up the process of determining filtered pixel values.

In particular, in one or more embodiments, the systems and methods generate and maintain a list of unique pixel values in the histogram. The unique pixel values correspond to entries in the histogram having, at one point, a non-zero count. The systems and methods determine filtered pixel values for a filtered output image by processing the entries in the histogram associated with the unique pixel values of the list. Thus, the list allows the systems and methods to avoid processing some or all of the entries in the histogram with zero counts.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1A:
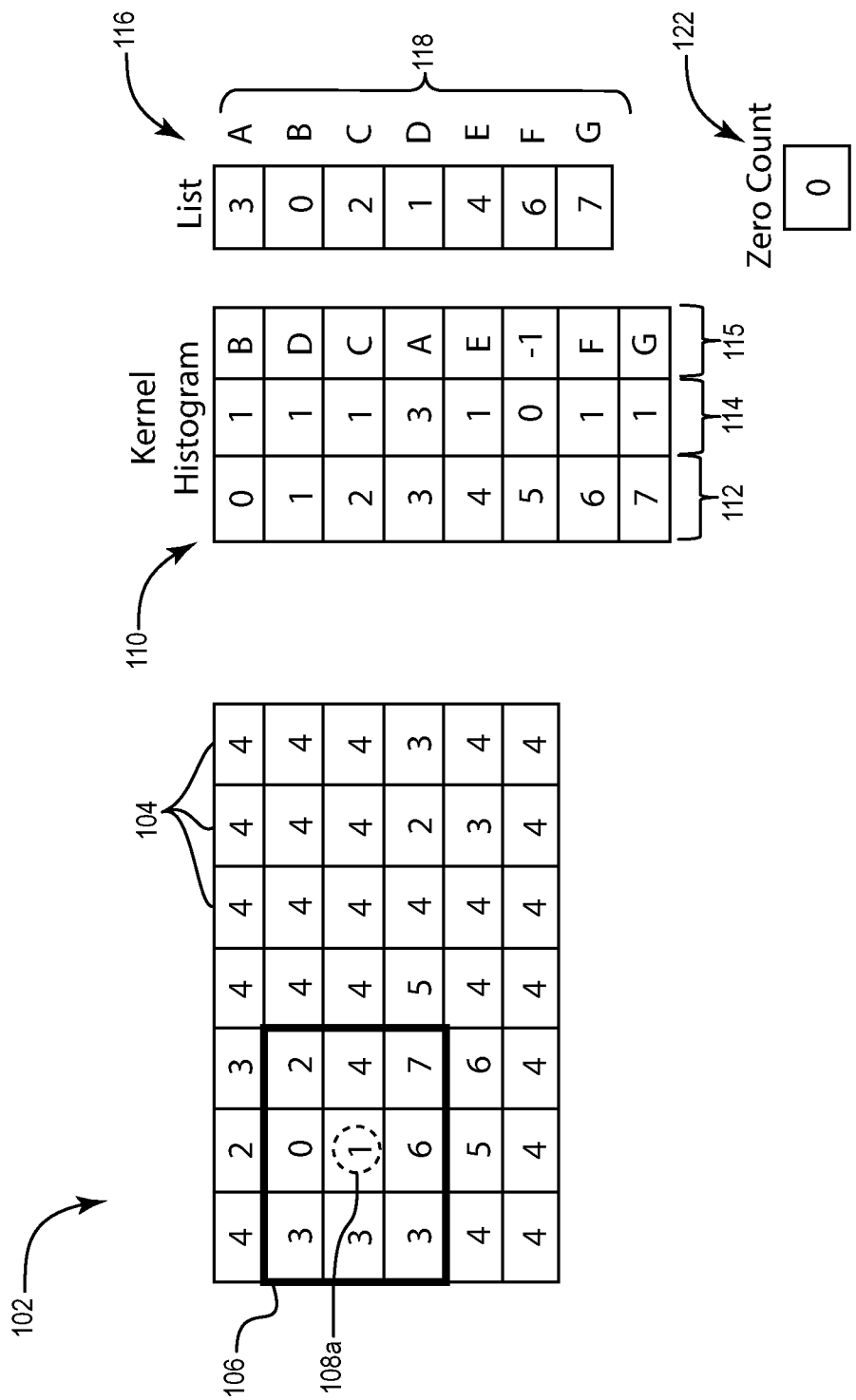
FIG. 1A illustrates an example kernel window and associated histogram at a first location in an input image in accordance with one or more embodiments.

One or more embodiments of the present disclosure include an image filtering system that implements a histogram-based filtering processes that intelligently processes a subset of histogram entries rather than all histogram entries to reduce computations and increase speed. In particular, the image filtering system tracks pixel values with non-zero counts in the histogram. Then, in one or more embodiments, when determining filtered pixel values, the image filtering system processes only the tracked entries in the histogram with non-zero counts. As explained in greater detail below, the image filtering system generates and maintains a list of unique pixel values that indicates entries in the histogram having, at one point, a non-zero count. Then when iterating through the histogram as part of filtering an image, the image filtering system avoids processing some or all of the entries in the histogram with zero counts.

As an overview, in one or more embodiments, the image filtering system applies a kernel window at incremental pixel locations of an input image to identify pixel values for pixels of the input image within the kernel window. As used herein a "kernel window" or "filter window" refers to an identified neighborhood of pixels around a pixel of interest. For example, a kernel window may refer to a group of pixels defined by a boundary of a window around a central pixel. A kernel window can include various shapes and dimensions to include any number of pixels therein.

In one or more embodiments, for each location of the kernel window, the image filtering system maintains a histogram including an entry for each pixel value represented within the kernel window and a count of the pixels within the kernel window having the identified pixel values. The image filtering system generates and updates a histogram to reflect counts of pixel values identified within the kernel window at a given location of the input image. In addition, at each iteration of the kernel window, the image filtering system updates the entries of the histogram to reflect the pixels within the boundary of the kernel window at each respective location.

The image filtering system then determines filtered pixel values for the pixels in an image to be filtered by generating a weighted average of pixel values represented within the histogram for a corresponding pixel of interest (e.g., pixel values within a kernel window for the corresponding pixel of interest) by analyzing the counts of pixel values in the histogram. To aid the image filtering system in avoiding the processing of some or all of the entries in the histogram with zero counts, the image filtering system maintains a list including unique pixel values identified within the kernel window. In particular, in one or more embodiments, the image filtering system identifies unique pixel values and maintains them in the list of unique pixel values. The pixel values are unique in that the list does not track multiple instances of the same pixel value being non-zero. Thus, if the kernel window includes multiple instances of a given pixel value, the given pixel value is included in the list a single time. When determining the filtered pixel values, rather than analyzing each possible entry within the histogram and a corresponding pixel value count, the image filtering system processes/iterates over entries of the histogram corresponding to pixel values within the list of unique pixel values. As such, the image filtering system avoids processing/iterating over some or all of the entries in the histogram with zero counts.

Moreover, in one or more embodiments, the image filtering system periodically updates the list by removing one or more pixel values having a zero-count within the histogram from the list of unique pixel values. As used herein, a "zero-count" refers to a pixel value of a histogram having a corresponding count of zero. Thus, a zero-count refers to a pixel value of a histogram that is not represented within a boundary of the kernel window at a given location. As such, in one or more embodiments, the image filtering system updates the list of unique pixel values by removing one or more reference pixel values corresponding to zero-counts or are otherwise not represented within the kernel window at a given location. In one or more embodiments, the image filtering system tracks a number of zero-counts pixel values of the histogram corresponding to pixel values within the list of unique pixel values. If the tracked number of zero-counts exceeds a threshold number, the image filtering system removes those pixel values from the list of unique pixel values.

To aid in updating the list, the image filtering system further tracks whether a pixel value of the histogram has a corresponding pixel value within the list and, if it does, where the corresponding pixel value exists within the list. In particular, as will be described in further detail below, in one or more embodiments, the image filtering system maintains, within the histogram, index values for each pixel value including an indication of whether a corresponding pixel value exists within the list. If a corresponding pixel value exists, the index values further indicates a location of the corresponding pixel value within the list. In this way, the image filtering system need not search through the entire list when updating the histogram and list or otherwise determining filtered pixel values.

The image filtering system described herein advantageously reduces the processing power and storage needed to generate a filtered output image by maintaining a histogram and list of unique pixel values in accordance to one or more embodiments described herein. For example, by generating and maintaining a list of unique pixel values, the image filtering system can determine filtered pixel values for a filtered output image while considering only or mainly pixel values in the histogram with non-zero counts. In this way, the image filtering system can avoid iterating over pixel values known to have a zero-count that would not contribute to a filtered pixel value, thus reducing the processing power needed to determine filtered pixel values for the filtered output image.

Additional detail will now be described by way of example in reference to the FIGS. For example, FIGS. 1A-1D provide an example embodiment in which the image filtering system incrementally applies a kernel window over a portion of an input digital image. As used herein, a "digital image" refers to digital data or a digital file for an image that is displayable via a graphical user interface of a display of a computing device. A digital image includes any number of pixels in addition to data or information about the digital image file (e.g., metadata). A digital image may include a wide variety of resolutions, sizes, or other features that affect the amount of digital data making up the digital image.

In particular, FIGS. 1A-1D provide an example in which the image filtering system applies a kernel window at four incremental locations of an input image to analyze pixel values (e.g., pixel intensity values) in order to determine a weighted pixel value for each pixel of interest of the input image. A "pixel values" refers to a color, shade, intensity, or other a pixel of a digital image.

More specifically, FIGS. 1A-1D illustrate an example in which the image filtering system maintains a histogram for the kernel window by generating the histogram at a first location of the kernel window and updating the histogram with each iteration of the kernel window (e.g., application of the kernel window at each incremental location). In addition, FIGS. 1A-1D illustrate an example in which the image filtering system generates and updates a list of unique pixel values to facilitate efficient computation of filtered pixel values in accordance with one or more embodiments described herein.

For example, FIG. 1A illustrates an image portion 102 of an input digital image including pixels 104 having pixel values. In particular, in the example shown in FIG. 1A, the image portion includes pixels 104 having corresponding pixel intensity values ranging from 0 to 7. It will be understood that one or more embodiments include a larger range of pixel values (e.g., based on a color or pixel-intensity resolution of the input image). Further, while the pixel intensity values 104 shown in FIG. 1A include numeric values from 0 to 7, the pixel values 104 can alternatively refer to binary values or other numbers representative of the intensity of a corresponding pixel.

As shown in FIG. 1A, the image filtering system applies a kernel window 106 at a first location on the image portion 102. In particular, as shown in FIG. 1A, the image filtering system applies the kernel window 106 at a location corresponding to a first pixel of interest 108a. (e.g., a first pixel location). In one or more embodiments, the pixel of interest 108a corresponds to a central location of the kernel window 106. As further shown in FIG. 1A, the image portion 102 includes nine underlying pixels 104 within a boundary of the kernel window 106. In particular, as shown in FIG. 1A, the kernel window 106 includes the pixel of interest 108a and eight neighboring pixels 104 within a 3×3 pixel window defined by the kernel window 106 at the first location. It will be understood that the image filtering system can apply a kernel window including any number of pixels and having dimensions corresponding to different shapes/dimensions.

In one or more embodiments, the image filtering system maintains a histogram 110 for the kernel window 106 at incremental locations of the input image. For example, in one or more embodiments, the image filtering system generates a histogram 110 for an initial location of the kernel window 106 and updates the histogram 110 for each iterative location of the kernel window 106 throughout the input image. In particular, as shown in FIG. 1A, the image filtering system generates the histogram 110 including entries having counts of pixel values corresponding to pixels 104 of the image portion 102 within the boundary of the kernel window 106.

As shown in FIG. 1A, the histogram 110 for the kernel window 106 at the first pixel location (around the first pixel of interest 108a) includes a first column 112 of pixel values. The first column 112 is included for aid in description herein of how the kernel histogram 110 functions. In one or more embodiments, the kernel histogram 110 may not include column 112. As shown in FIG. 1A, the first column 112 includes pixel values ranging from 0 to 7 corresponding to all possible pixel values of the input image. In alternative embodiments, the histogram 110 includes only pixel values included in the current location of the kernel window 106 or a previous location of the kernel window 106. In such embodiments, the size of the histogram 110 grows as the kernel window 106 moves about the input image.

As further shown in FIG. 1A, the histogram 110 includes a second column 114 of counts or buckets for each of the corresponding pixel values of the first column 112 of the histogram 110. For example, as shown in FIG. 1A, the second column 114 of the histogram 110 at the first location includes a single count of "1" for the pixel values of "0, 1, 2, 4, 6, and 7." As further shown, the second column 114 includes a count of "3" for the pixel value of "3."

In one or more embodiments, the image filtering system generates a list of unique pixel values identified within the kernel window 106 at a current location and/or at one or more previous locations (e.g., unique pixel values identified within the kernel window 106 at previous locations having zero-counts within the kernel window 106 at a current location). For example, as shown in FIG. 1A, the image filtering system generates a list 116 of unique pixel values. As shown in FIG. 1A, the list 116 of unique pixel values includes each of the pixel values in the histogram 110 having a count. As will be described in further detail with regard to FIGS. 1B-1D, the list 116 of unique pixel values serves as a reference object that includes unique pixel values to enable the image filtering system to determine filtered pixel values based on counts for pixel values of the histogram 110 represented within the list 116 of unique pixel values without having to iterate though each bucket in the histogram 110.

The image filtering system may order the pixel values within the list 116 of unique pixel values in a variety of ways. As an example, in one or more embodiments, the image filtering system orders the pixel values in order of increasing pixel intensity (e.g., from 0 to 7). Alternatively, in one or more embodiments, the image filtering system generates the list 116 of unique pixel values in the order in which they are identified, resulting in a random order shown in FIG. 1A. Thus, in one or more embodiments, the list 116 of unique pixel values includes a non-ordered list of reference pixel values.

As further shown in FIG. 1A, each of the unique pixel values within the list 116 have a corresponding location within the list 116, denoted by offset values A-G 118. In FIG. 1A, the histogram 110 includes a third column 115 including index values that identify whether a corresponding pixel value exists within the list 116 and, if it does, the location within the list 116 denoted by offset values A-G 118. For example, for each pixel value of the histogram 110 that exists within the list 116, the index value includes an index value indicating a location within the list 116 where the unique pixel value can be found. Alternatively, where a pixel value of the histogram 110 does not exist within the list 116 (e.g., "5" pixel value), the corresponding index value includes a "−1" value. It will be understood that while FIG. 1A shows an example in which index values are denoted by alphabetical letters (e.g., A-G), one or more embodiments may represent index values by numbers or other indicators of location within the list 116. In addition, while FIG. 1A shows an example in which non-represented pixel values have an index value of "−1," one or more embodiments may represent non-represented pixel values using other values (e.g., 0 value, empty cell, etc.)

As further shown in FIG. 1A, the image filtering system tracks a number of zero-counts 122 for pixel values in the list 116 of unique pixel values. In particular, as will be described in further detail below, the image filtering system tracks a zero-count 122 corresponding to a number of zero-counts within the histogram 110 for those reference pixel values represented within the list 116 of unique pixel values. Accordingly, as shown in FIG. 1A, because none of the reference pixel values 116 in the list 116 of unique pixel values have a count of zero within the histogram 110, the tracked number of zero-counts 122 equals "0." Additional detail with regard to tracking the number of zero-counts 122 and updating the list 116 of unique pixel values based on the tracked number of zero-counts 122 is described in further detail below.

In addition to generating the histogram 110 and the list 116 of unique pixel values for the kernel window 106 at the initial location, the image filtering system further calculates a filtered pixel value for the pixel of interest 108a based on pixel values for the pixels 104 within the boundary of the kernel window 106. In one or more embodiments, the image filtering system determines the filtered pixel value based on a weighted average of pixel values and corresponding counts in the histogram 110 for the kernel window at the location corresponding to the pixel of interest 108a. Thus, in one or more embodiments, the image filtering system calculates a filtered value for the first pixel of interest 108a based on values within the first column 112 and second column 114 of the histogram 110.

More specifically, in one or more embodiments, the image filtering system determines the filtered pixel value based on the counts of the histogram 110 for pixel values corresponding to the pixel values of the list 116 of unique pixel values. For example. In one or more embodiments, the image filtering system processes the counts of the pixel values of the histogram 110 corresponding to pixel values represented within the list 116 of unique pixel values while ignoring the buckets associated with all other pixel values of the histogram 110 not represented within the list 116 of unique pixel values. In one or more embodiments, the image filtering system calculates the filtered pixel value based on counts of pixel values corresponding to index values within the list 116 while discarding or otherwise ignoring any counts of pixel values having histogram 110 counts of zero.

The image filtering system can accurately determine the filtered pixel value while ignoring those pixel values within the list 116 of unique pixel values because the image filtering system can assume that pixel values not included within the list 116 of unique pixel values correspond to zero-counts within the histogram 110. For instance, in the example shown in FIG. 1A, the only possible pixel value not represented within the list 116 of unique pixel values is "5," which corresponds to a zero-count for the pixel value of "5" within the histogram 110. Thus, the image filtering system can compute or otherwise determine the filtered pixel value for the first pixel of interest 108a without querying or otherwise considering the entry of histogram 110 corresponding to "5," thus reducing an amount of processing power needed to determine the filtered value for the first location of the kernel window 106.

For example, in embodiments in which the image filtering system applies a bilateral filter, the image filtering system determines a difference between the pixel value associated with a bucket and the kernel center pixel value. The image filtering system then looks up or determines a weight for this difference. The image filtering system then takes the pixel value times the weight times the bucket count and adds the result to a kernel sum. After adding all histogram contributions to the kernel, the image filtering system normalizes the total weights and saves the filtered pixel value.

Figure 1B:
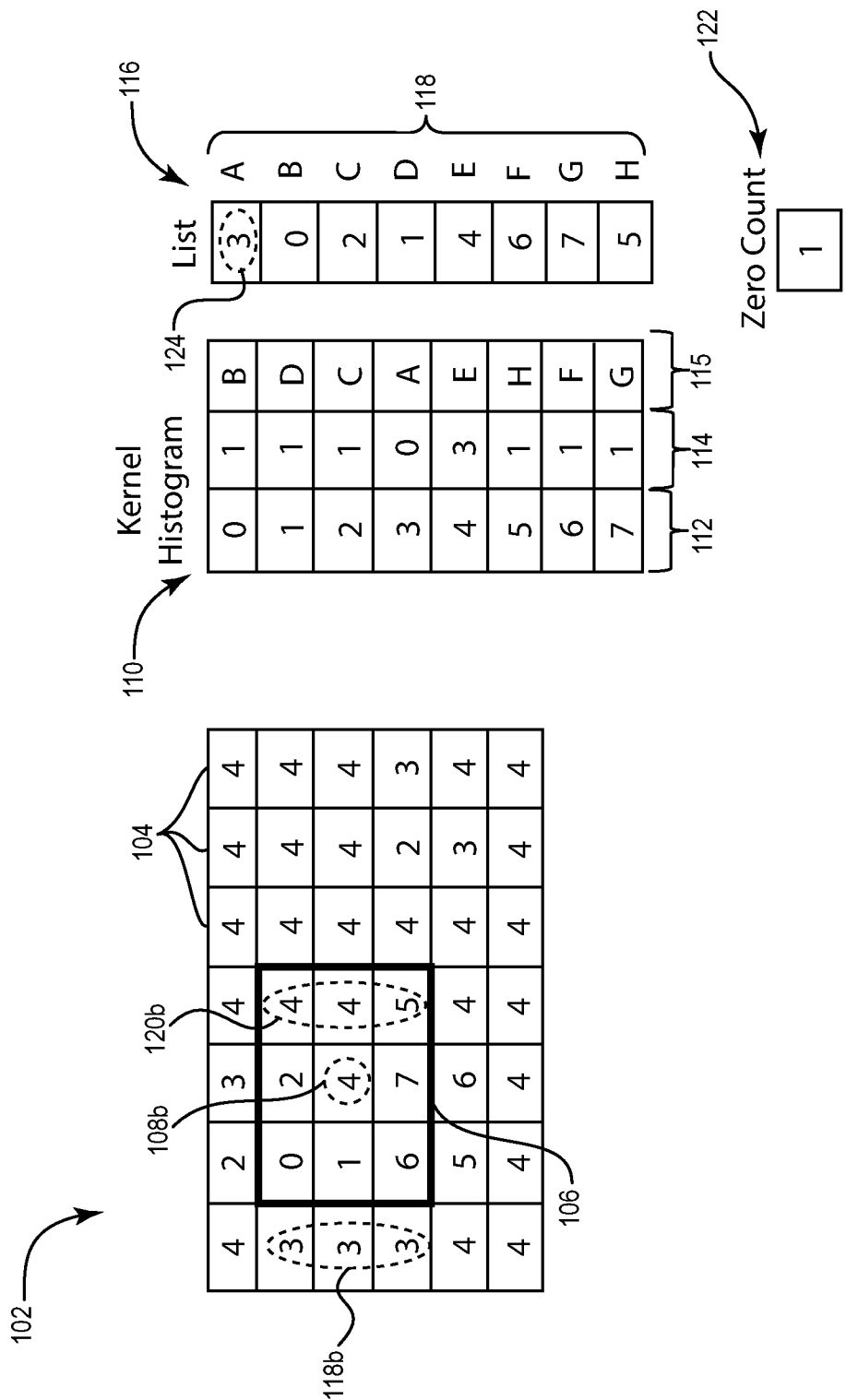
FIG. 1B illustrates an example kernel window and associated histogram at a second location in accordance with one or more embodiments.

As mentioned above, after generating the histogram 110 and the list 116 of unique pixel values for the kernel window 106 at the first location, the image filtering system applies the kernel window at iterative locations throughout the input image. For example, as shown in FIG. 1B, the image filtering system applies the kernel window 106 at a second location within the image portion 102 of the input image corresponding to a second pixel of interest 108b. In particular, as shown in FIG. 1B, the image filtering system iteratively applies the kernel window 106 at the second location corresponding to the second pixel of interest 108b by moving the kernel window 106 one pixel to the right from the first location corresponding to the first pixel of interest 108a.

Upon moving the kernel window 106 one pixel to the right, the image filtering system updates the histogram 110 to reflect a current makeup of pixel values for the pixels 104 contained within the boundary of the kernel window 106 at the current location. In one or more embodiments, the image filtering system updates the histogram 110 to reflect the current makeup of pixel values by analyzing the different pixels 104 between the kernel window 106 at the first location and second location.

In particular, as shown in FIG. 1B, the image portion 102 includes removed pixels 118b representative of the left-most column of pixels 104 within the kernel window 106 at the first location (as shown in FIG. 1A) that no longer reside within the boundary of the kernel window 106 at the second location. As further shown in FIG. 1B, the image portion 102 includes additional pixels 120b representative of the right-most column of pixels 104 within the kernel window 106 at the second location that did not reside within the boundary of the kernel window 106 at the first location. Accordingly, where the kernel window 106 includes a 3×3 pixel window, moving the kernel window 106 one pixel to the right results in three additional pixels 120b replacing three removed pixels 118b. It will be understood that in one or more embodiments, all pixels 104 within the boundary of the kernel window 106 other than the removed pixels 118b and additional pixels 120b remain the same between two consecutive positions of the kernel window 106.

Rather than reconstructing a new histogram by analyzing each of the pixels 104 of the image portion 102 within the boundary (e.g., updated boundary) of the kernel window 106 at the second location, in one or more embodiments, the image filtering system updates the histogram 110 based on the removed pixels 118b and the additional pixels 120b (while ignoring those pixels 104 that both fall within the kernel window 106 at the first location (as shown in FIG. 1A) and the kernel window 106 at the second location (as shown in FIG. 1B). For example, in one or more embodiments, the image filtering system updates the histogram 110 by adding counts to the histogram 110 for the pixel values corresponding to the pixels in the column of additional pixels 120b. In addition, in one or more embodiments, the image filtering system updates the histogram 110 by subtracting counts corresponding to the pixel values of the pixels in the column of removed pixels 118b.

In particular, the image filtering system adds the additional pixels 120b to the histogram 110 by first determining whether pixel values of the additional pixels 120b exist within the list 116 (e.g., based on the index value of the third column 115). For instance, with regard to the pixel value of "4," the image filtering system may determine that "4" already exists within the list 116 based on the index value of "E" corresponding to the pixel value of "4" within the histogram 110. In response, the image filtering system increments the count for the pixel value of "4" for each instance of "4" in the additional pixels 120b. Alternatively, with regard to the pixel value of "5," the image filtering system may determine that "5" does not exist within the list 116 based on the "−1" index value within the histogram 110 (e.g., as shown in FIG. 1A). Accordingly, the image filtering system may add "5" to the list 116, update an index value from "−1" to "H" within the histogram corresponding to the location of "5" within the list 116, and further increment the count for "5" within the histogram 110 based on the additional pixels 120b within the kernel window 106 at the second location.

In addition, with regard to the removed pixels 118b, the image filtering system further updates the histogram 116 by subtracting counts of pixel values of the removed pixels 118b from the histogram 110. In particular, as shown in FIG. 1B, where the removed pixels include three instances of a pixel value of "3," the image filtering system reduces a pixel count corresponding to the pixel value of "3," from the second column 114 of the histogram 110. Accordingly, in contrast to the count of "3" shown in FIG. 1A, the image filtering system reduces the count for the pixel value of "3" from "3" to "0."

When updating the histogram 110 and the list 116, in some embodiments, the image filtering system can decrement the zero count 122. For example, while not specifically shown in FIGS. 1A-1D, if the kernel window 106 were moved from the position shown in FIG. 1B to a position 3 pixels to the right, the pixel value of three would be within the kernel window. In updating a count for such a situation, the image filtering system increments a previous zero-count to a non-zero count within the histogram (i.e., the count associated with the pixel value of 3). Accordingly, in one or more embodiments, the image filtering system updates the zero-count 122 by decrementing the zero-count 122 to reflect a previous zero-count becoming a non-zero count within the histogram 110.

As mentioned above, the image filtering system further updates the list 116 to include any new pixel values from the additional pixels 120b previously unrepresented within the list 116. For example, as shown in FIG. 1B, the additional pixels 120b include instances of pixels 104 having pixel values of "4" and "5." Because the list 116 of unique pixel values already includes a reference pixel value of "4," the image filtering system can ignore the pixel value of "4" in updating the list 116 of unique pixel values. However, because the list 116 of unique pixel values for the first pixel of interest 108a (as shown in FIG. 1A) does not include a reference pixel value of "5," the image filtering system updates the list 116 of unique pixel values by adding "5" to the list 116 of unique pixel values. As shown in FIG. 1B, in one or more embodiments, the image filtering system adds the new pixel value by appending the new reference pixel value to the end of the list 116 of unique pixel values.

In addition to adding the pixel value of "5" to the list 116, the image filtering system further updates a corresponding index value within the histogram 110. For example, as shown in FIG. 1B, the image filtering system changes an index value from "−1" to "H" for the pixel value of "5" to identify that the pixel value "5" exists within the list 116 at a location of "H" within the list 116. In addition, as mentioned above, the image filtering system increments the count for the pixel value "5" to "1" to reflect the number of pixels within the kernel window 106 having the pixel value of "5."

As shown in FIG. 1B, the image filtering system further updates the tracked zero-count 122. Where the pixel value "3" corresponds to a count of zero within the histogram 110, and because the list 116 of unique pixel values the pixel value of "3," the image filtering system updates the tracked zero-count 122 to equal one based on the single identified zero-count 124. It will be understood that while the tracked zero-count 122 shown in FIG. 1B corresponds to a number of zero-counts within the list 116 of unique pixel values, the tracked number of zero-counts 122 does not necessarily correspond to the number of zero-counts within the histogram 110. In one or more embodiments, the image filtering system simply increments or decrements the zero-count 122 based on counts for the pixel values changing based on subtracting removed pixels 118b and/or adding additional pixels 120b to the histogram 110.

Upon updating the histogram 110 and list 116 of unique pixel values, the image filtering system further determines a filtered pixel value for the pixel of interest 118b at the second location. For example, in one or more embodiments, the image filtering system determines a weighted pixel value for the second pixel of interest 118b similar to one or more embodiments described above with respect to determining a weighted pixel value for the first pixel of interest 118a. In particular, the image filtering system calculates the weighted average by processing only the buckets of the histogram associated with pixel values included in the list 116 of unique pixel values.

Prior to or after determining the filtered pixel value (e.g., the weighted average), the image filtering system can perform a check to determine if the tracked number of zero-counts 122 exceeds a threshold number. If the tracked number of zero-counts 122 exceeds a threshold, the image filtering system may remove certain entries of the list 116 of unique pixel values corresponding to zero-counts within the histogram 110. For the sake of explanation with respect to FIG. 1B, the image filtering system may determine that a tracked zero-count 122 of "1" does not exceed the threshold. Based on this determination, the image filtering system may proceed to the next iteration of the filter window by applying the filter window at a next location within the input image.

Figure 1C:
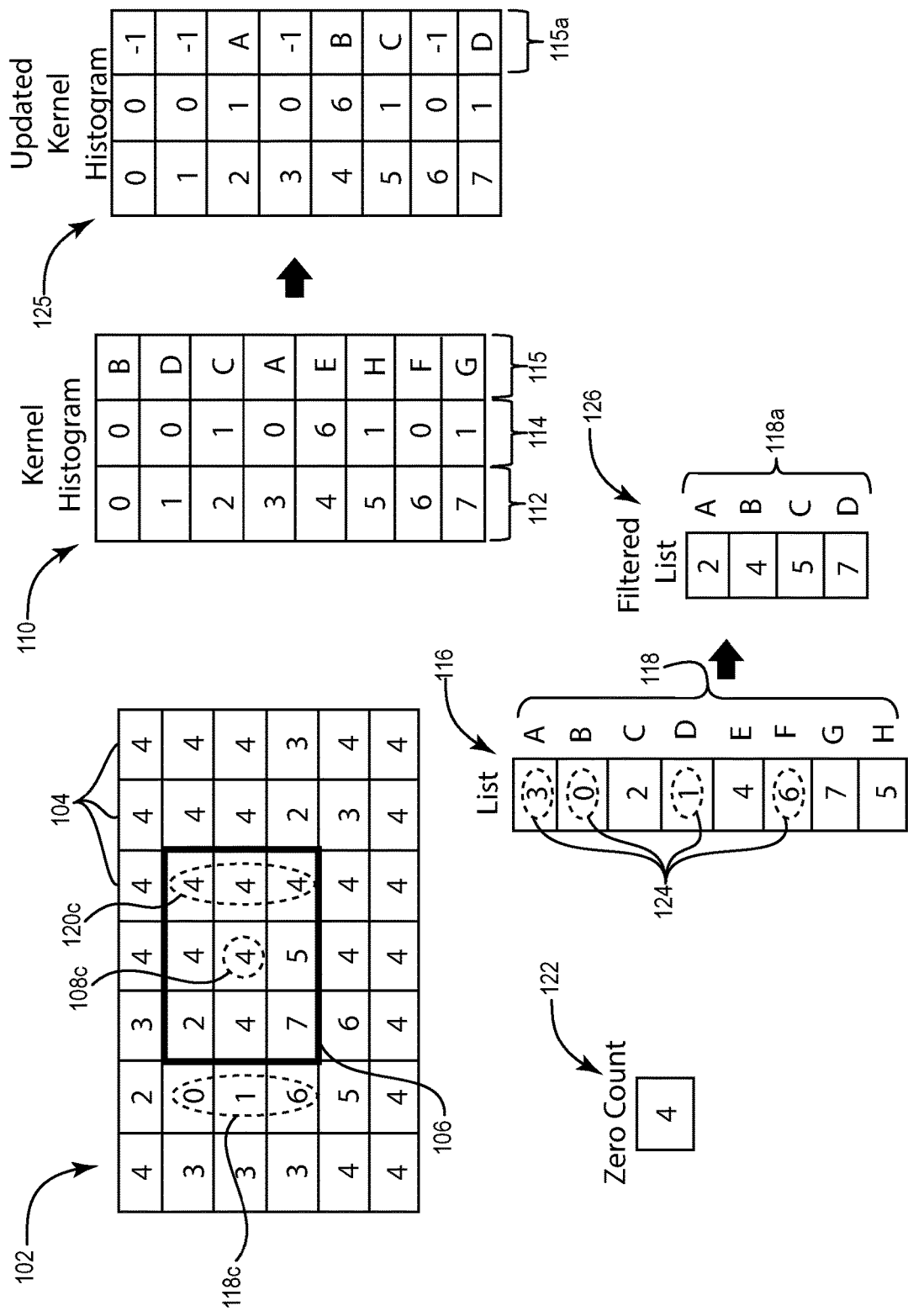
FIG. 1C illustrates an example kernel window and associated histogram at a third location in accordance with one or more embodiments.

As such, the image filtering system applies the kernel window 106 at the next incremental location on the image portion 102 (as shown in FIG. 1C).

In particular, as shown in FIG. 1C, the image filtering system applies the kernel window 106 at the next location of the image portion 102. For example, as shown in FIG. 1C, the image filtering system applies the kernel window 106 at a third location corresponding to a third pixel of interest 108c. In particular, as shown in FIG. 1C, the image filtering system applies the kernel window 106 at the third location by moving the kernel window 106 one pixel to the right from the second location shown in FIG. 1B.

Similar to one or more embodiments described above, upon moving the kernel window 106 to the third location, the image filtering system updates the histogram 110 to reflect the makeup of pixels 104 within the boundary of the kernel window 106 at the third location. For example, as shown in FIG. 1C, the underlying pixels 104 of the image portion 102 include additional pixels 120c. In addition, due to the new location of the kernel window 106, removed pixels 118c no longer lie within the boundary of the kernel window 106.

As shown in FIG. 1C, the image filtering system updates the histogram 110 by adding pixel counts for respective pixel values of the additional pixels 120c within the boundary of the kernel window 106. For example, as shown in FIG. 1C, the additional pixels 120c include three new instances of pixels 104 each having a pixel value of "4." As such, the image filtering system updates the histogram 110 by adding three to the pixel count corresponding to the pixel value of "4." Accordingly, the pixel count for the pixel value of "4" becomes "6" corresponding to six instances of pixels 104 having a pixel value of "4" within the boundary of the kernel window 106.

As shown in FIG. 1C, the image filtering system further updates the histogram 110 to reflect removal of the removed pixels 118c from within the boundary of the kernel window 106. For example, as shown in FIG. 1C, the removed pixels 118c include pixels 104 having values of "0, 1, and 6." Accordingly, the image filtering system updates the histogram 110 by reducing the pixel counts for pixel values "0, 1, and 6" by one.

In addition, because the list 116 of unique pixel values already includes the pixel value(s) of each of the additional pixels 120c, the image filtering system need not update the list 116 of unique pixel values to reflect pixel values that are previously unrepresented within the list 116 of unique pixel values. Accordingly, the image filtering system does not add a reference pixel value of "4" to the list 116 of unique pixel values. In addition, because the histogram 110 includes index values for each location within the list 116, the image filtering system need not immediately update index values of the histogram 110 to include any additional pixel values of the list 116.

Nevertheless, as a result of the updated counts of the histogram 110, the image filtering system updates the tracked number of zero-counts to reflect the removed pixels 118c no longer included within the kernel window 106. In particular, as shown in FIG. 1C, the image filtering system updates the zero-count 122 to "4" to reflect the four instances of zero-counts 124 corresponding to counts of zero within the histogram 110 for those values represented within the list 116 of unique pixel values. Thus, as shown in FIG. 1C, the image filtering system identifies zero-counts 124 for four reference pixel values of "3," "0," "1," and "6" and accordingly updates the tracked zero-count 122 to "4."

In addition, as mentioned above, the image filtering system compares the tracked number of zero-counts 122 to a threshold number. For example, the image filtering system can compare the tracked number of zero-counts 122 to a threshold number and determine (for the sake of explanation) that the identified number of zero-counts 122 exceeds the threshold. In particular, as shown in FIG. 1C, the image filtering system determines that four zero-counts exceeds a threshold value. Accordingly, the image filtering system determines to reduce the list 116 of unique pixel values to more accurately reflect those values within the current iteration of the kernel window 106.

In particular, as shown in FIG. 1C, the image filtering system removes any values from the list 116 of unique pixel values to generate a filtered list 126 including pixel values corresponding to those pixel values of the histogram 110 having non-zero counts. In one or more embodiments, the image filtering system generates the filtered list 126 by looping through pixel values of the list 116 and, for each pixel value corresponding to a non-zero count within the histogram 110, copying the pixel value to the filtered list 126. Alternatively, in one or more embodiments, the image filtering system reconstructs the filtered list 126 by evaluating the pixel values of the pixels 104 within the kernel window 106 and generating the reduced list of unique pixel values 126 anew. As another alternative, in one or more embodiments, the image filtering system generates the filtered list 126 by identifying each pixel value having a non-zero count and generating the filtered list 126 from those identified pixel values.

In addition to generally creating the filtered list 126, the image filtering system further identifies new index values A-D 118a and generates an updated kernel histogram 125 including modified index values corresponding to the updated locations (e.g., offsets) of pixel values within the filtered list 126. In particular, as shown in FIG. 1C, the image filtering system updates the kernel histogram 110 to generate the updated kernel histogram 125 by updating the third column 115a to reflect new index values A-D 118a corresponding to pixel values from the filtered list 126.

In addition, as will be described in further detail below, the image filtering system can utilize the filtered list 126 and updated kernel histogram 125 going forward. Accordingly, generating the filtered list 126, the image filtering system further determines a filtered pixel value for the pixel of interest 118c. In particular, the image filtering system calculates the weighted average by processing only the buckets of the updated histogram 125 associated with pixel values included in the updated list 126 of unique pixel values. Thus, rather than processing the all 8 buckets in the updated histogram 125, the image filtering system processes only the four buckets in the updated histogram 125 corresponding to the four pixel values in the filtered list 126. Thus, the list 116/126 facilitates reducing a number of calculations by intelligently analyzing a subset of the buckets in the histogram 110/125. Thus, the use of the list 116/126 allows the image filtering system to more quickly calculate a filtered pixel value for the pixel of interest while using less processing power.

Figure 1D:
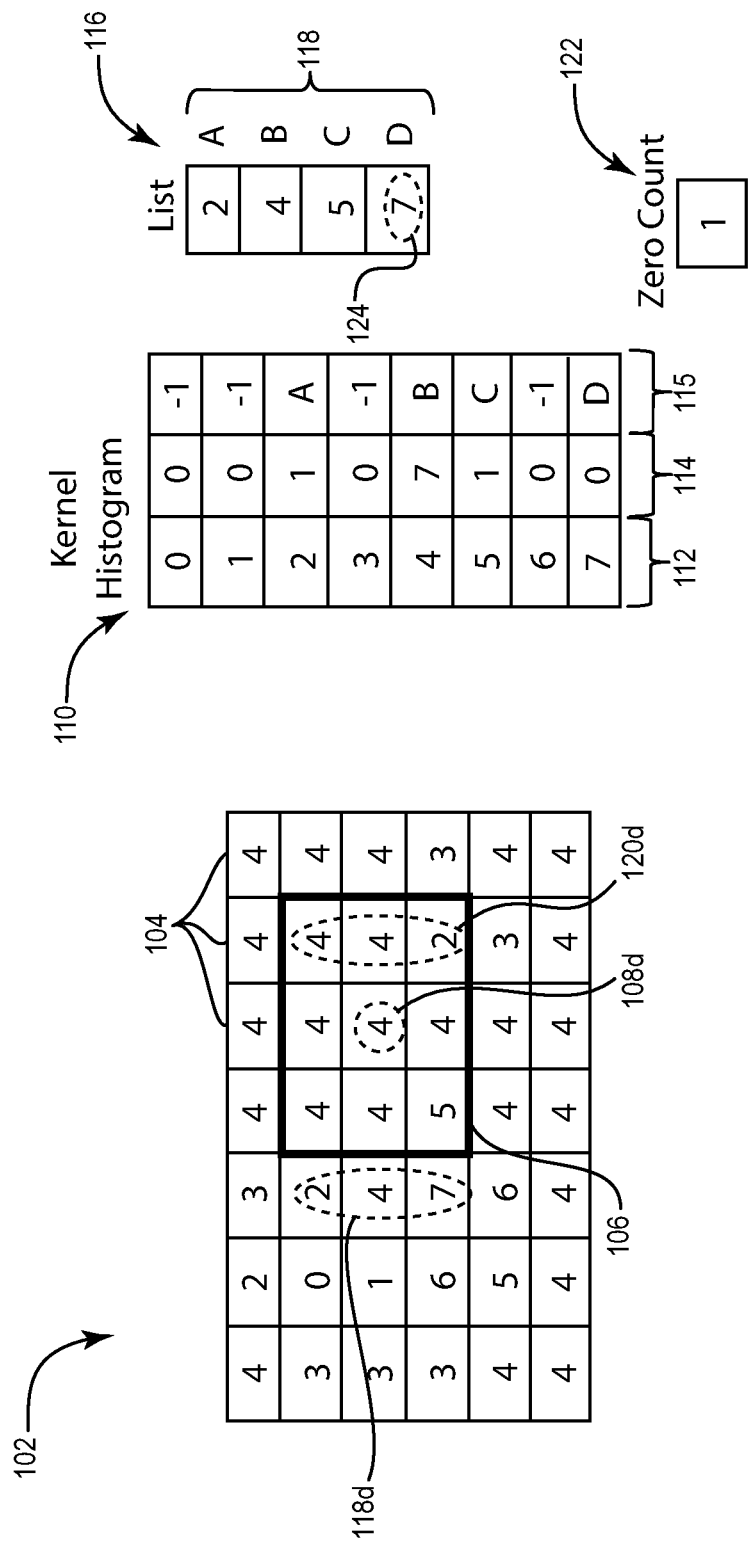
FIG. 1D illustrates an example kernel window and associated histogram at a fourth location in accordance with one or more embodiments.

Moving onto FIG. 1D, the image filtering system continues to apply the kernel window 106 at incremental locations of the image portion 102. For example, as shown in FIG. 1D, the image filtering system applies the kernel window 106 at the next location of the image portion 102 by moving the kernel window 106 one pixel to the right from the previous location. In particular, as shown in FIG. 1D, the image filtering system applies the kernel window 106 at a fourth location corresponding to the fourth pixel of interest 108d by moving the kernel window 106 one pixel to the right from the third location discussed above in connection with FIG. 1C.

Similar to one or more embodiments described above, the image filtering system updates the entries of the histogram 110 to reflect the values of the pixels 104 within the kernel window 106 at the current position. For example, as shown in FIG. 1D, the image filtering system updates the histogram 110 shown in FIG. 1C to reflect a current makeup of pixels 104 within the kernel window 106 at the fourth position. In particular, the image filtering system updates the histogram 110 to include values of the additional pixels 120d while subtracting counts for the values of the removed pixels 118d.

For example, similar to one or more embodiments described above, the image filtering system adds values of the additional pixels 120d to the histogram 110. In particular, because the additional pixels 120d include two instances of the pixel value of "4," the image filtering system updates the histogram 110 by adding two counts to the second column 114 corresponding to the pixel value of "4" in the first column 112. In addition, because the additional pixels 120d include a single instance of the pixel value of "2," the image filtering system further updates the histogram 110 by adding a single count to the second column 114 corresponding to the pixel value of "2" in the first column 112. Further, because each of "2" and "4" are represented within the list 116, the image filtering system simply increments the counts of those pixel values without modifying any of the index values within the histogram 110.

In addition, the image filtering system further updates the histogram 110 by subtracting counts for each of the removed pixels 118d. In particular, as shown in FIG. 1D, the removed pixels 118d include single instances of pixel values "2, 4, and 7." As such, the image filtering system updates the histogram 110 by subtracting a single count from the second column 114 for the pixel counts corresponding to pixel values "2, 4, and 7" in the first column 112. In addition, because "7" goes from a count of "1" to a count of "0" (as a result of the removed pixels 118d), the image filtering system updates the zero-count 122 to "1" to reflect a number of pixel values within the list 116 that are not represented within the kernel window 106 at the fourth location.

Similar to one or more embodiments described above, the image filtering system additionally updates the list 116 of unique pixel values to reflect any new entries to the histogram 110 previously not represented within the reduced list of unique pixel values 126. In particular, where the additional pixels 120d include any pixel values not already included in the list 116 of unique pixel values, the image filtering system adds any new pixel values. In contrast, where the additional pixels 120d only include instances of pixel values already included within the list 116 of unique pixel values (as shown in FIG. 1D), the image filtering system does not add any new values to the list 116 of unique pixel values.

In one or more embodiments, the image filtering system performs a similar application of the kernel window 106 for pixels of interest across the entire input image. In addition, in one or more embodiments, the image filtering system similarly maintains the histogram 110 and list 116 of unique pixel values for each iterative location of the kernel window 106. It will be understood that the image filtering system may reduce the list 116 of unique pixel values any number of times while incrementally applying the kernel window 106 at each incremental location throughout the input image.

Using a similar process described in connection with FIGS. 1A-1D, the image filtering system can analyze each pixel of an input image and determine modified (e.g., weighted) pixel values that make up a filtered output image. For example, as mentioned above, the image filtering system can apply a kernel window at each incremental location and determine a filtered pixel value for each incremental location. In particular, the image filtering system can determine the filtered pixel value by selectively considering counts of pixel values within the histogram corresponding to the pixel values represented within the list of unique pixel values (while ignoring pixel values that do not correspond to pixel values in the list of unique pixel values). Throughout this process, the image filtering system periodically filters zero counts from the list of unique pixel values, thus facilitating a more efficient determination of filtered pixel values in generating a filtered output image.

The example of FIGS. 1A-1D is a simplified scenario with only eight buckets in the histogram for ease of description. A histogram for a sixteen-bit digital image can include up to 65536 buckets. One will appreciate in light of the disclosure herein that the processing the buckets associated with pixel values in the list of unique pixel values can provide significant time and computational resources savings in such instances. Indeed, testing has shown that implementations of the list of unique pixel values filters images at up to 17 times the speed of conventional image filters.

In one or more embodiments, the image filtering system further improves upon the filtering process by truncating a number of possible pixel values in the input image. For example, prior to applying the kernel window at the first location and iterating the kernel window throughout the input image, the image filtering system groups, downsamples, combines, or otherwise truncates ranges of possible pixel values from the input image into a truncated (e.g., reduced) set of pixel values representing the input image. For example, where an input image has a resolution in which pixels can have a range of 32,000 pixel values, the image filtering system may generate a truncated representation of the input image by combining ranges of pixel values into 2,000 (or other reduced number) of pixel values.

By truncating the pixel values from a higher number of possible pixel values, the image filtering system generates a histogram and a list of unique pixel values having fewer entries and larger counts. In such instances, the benefits of the use of the list of unique pixel values to process only a subset of the buckets in the histogram is magnified. Thus, truncating or masking off any low order pure noise bits in the input digital image increases the speed gains produced by one or more implementations of the image filtering system described herein. Furthermore, most conventional image scanners and cameras do not produce valid information in the low 2-6 bits of the 16 bits in every pixel. This means there are even fewer unique pixels under the kernel at any given kernel application and implementations of the image filtering system described herein allows for skipping even more zero count histogram buckets.

Figure 2:
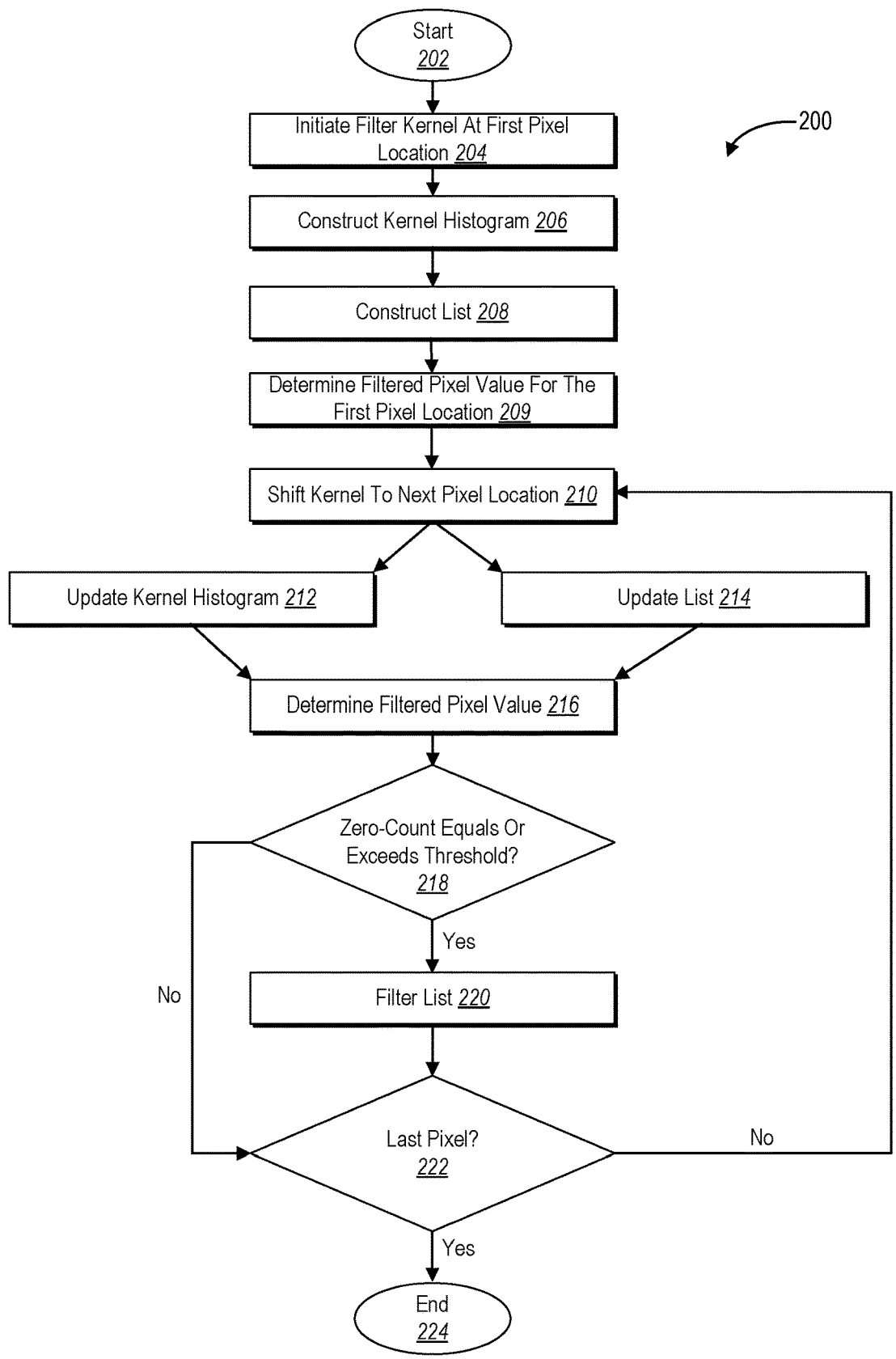
FIG. 2 illustrates a flow diagram of filtering an input image in accordance with one or more embodiments.

FIG. 2 illustrates an example method 200 for filtering an input image to generate a filtered output image. Acts 208-216 can comprise the corresponding structure for a step for determining filtered pixel values for each location of the kernel window by processing only the counts of pixels in the histogram having or having had a non-zero count.

The method 200 shown in FIG. 2 illustrates an example implementation that involves filtering an input image to generate a filtered output image. In one or more embodiments, the input image refers to a scan, a copy, or an original version of a digital image including any number of pixels having a range of possible pixel values (e.g., intensity values, color values, grayscale values) depending on a resolution of the input image. The input image can include a color image or black and white image and may include any number of possible pixel values representative of colors, intensity values, or other type of pixel value(s). In addition, while one or more embodiments described herein relate specifically to determining filtered pixel values based on pixel intensity values, features and functionality described herein can similarly relate to other types of pixel values (e.g., color, grayscale).

The method 200 starts 202 and proceeds to initiate 204 a kernel window at a first pixel location. In particular, the image filtering system applies a kernel window around a first pixel of interest of an input image. As mentioned above, the kernel window can refer to a window including any number of neighboring pixels around or nearby a pixel of interest.

As shown in FIG. 2, the method 200 further includes constructing 206 a histogram. In particular, the image filtering system constructs the histogram for the kernel window at the first location within the input image. In one or more embodiments, the image filtering system constructs the histogram by analyzing each pixel within the boundary of the kernel window and generating a histogram including an identification of each pixel and a corresponding count of values within the kernel window for each of the pixel values.

Additionally, the method 200 includes constructing 208 a list of unique pixel values. In particular, the image filtering system constructs the list of unique pixel values including a listing of pixel values known to exist within a current version of the histogram and/or in one or more previous versions of the histogram. Upon initial construction, the list of unique pixel values includes a listing of values corresponding to each unique pixel value identified within the boundary of the kernel window at the first location. In other words, an initial construction of the list of unique pixel values may include only those values represented within the kernel window at the first location (since the kernel window has not been applied at any previous locations).

As shown in FIG. 2, the method 200 includes determining 209 a filtered pixel value for the first pixel location. In particular, the image filtering system determines a filtered pixel value for a pixel of interest (of the input image) corresponding to an initial location of the kernel window. In one or more embodiments, the image filtering system determines the filtered pixel value by calculating a weighted average of nearby pixels to the pixel of interest. For example, in one or more embodiments, the image filtering system calculates the filtered pixel value by calculating a weighted average based on the pixel values and corresponding counts of pixel values included within the histogram.

Similar to one or more embodiments described herein, determining the filtered value for the first pixel location includes analyzing or otherwise considering those pixel values of the histogram corresponding to pixel values contained within the list of unique pixel values. For example, rather than computing a weighted average of nearby pixels for the first location based on all values and corresponding counts within the histogram, in one or more embodiments, the image filtering system only considers those values and counts of the histogram for corresponding pixel values within the list of unique pixel values. In this way, the image filtering system avoids performing unnecessary computations for pixel values and counts known to have a zero-count (and thus will not contribute to the weighted average of the nearby pixels to the first location).

After calculating the filtered pixel value for the first pixel location, the method 200 includes shifting 210 the kernel window to a next pixel location. For example, the image filtering system can apply the kernel window at a next location by sliding the kernel window one pixel to the left, right, up, or down with respect to the first pixel location. In one or more embodiments, the image filtering system shifts the kernel window to a next location such that the kernel window at the next location includes at least a portion of the same pixels as contained within the boundary of the kernel window at the preceding location. In this way, the image filtering system can maintain the histogram and determine a filtered pixel value based on those pixels that differ between the kernel window at a current position and the kernel window at a previous position.

As shown in FIG. 2, the method 200 includes updating 212 the histogram. In particular, in one or more embodiments, the image filtering system updates the histogram to include additional pixels that fall within the boundary of the kernel window at the next pixel location. In addition, the image filtering system updates the histogram to exclude those pixels that fall outside the boundary of the kernel window that fell within the kernel window at the previous location. In one or more embodiments, updating the histogram includes adding counts for the pixel values of additional pixels that move within the boundary of the kernel window at the next pixel location and subtracting counts for the pixel values of removed pixels that move outside the boundary of the kernel window.

In addition, as shown in FIG. 2, the method 200 includes updating 214 the list of unique pixel values. In particular, in one or more embodiments, the image filtering system updates the list of unique pixel values to include one or more new pixel values not previously included within the list of unique pixel values. For example, where the histogram at the next location includes one or more pixels having pixel values not previously included within the list of unique pixel values, the image filtering system updates the list of unique pixel values to include the new unique pixel value(s). Alternatively, where each of the new pixels within the histogram at the current location include pixel values previously included within the list of unique pixel values, updating the list of unique pixel values involves leaving the list of unique pixel values unchanged for the current iteration of the kernel window.

In addition to updating counts within the histogram and further adding new pixel values to the list, the image filtering system further updates the histogram by updating index values of the histogram to reflect any new pixel values added to the list. For example, when adding a pixel value previously unrepresented within the list, the image filtering system adds a new index value corresponding to a location of the new pixel value within the list. In particular, in one or more embodiments, the image filtering system changes an index value for the new pixel value from a negative indicator (e.g., "−1" or an empty cell) to the location (e.g., A-G) of the new pixel value within the list.

As further shown in FIG. 2, upon updating the histogram and/or the list of unique pixel values, the method 200 includes determining 216 a filtered pixel value for a pixel of interest corresponding to a current location of the kernel window. For example, the image filtering system can determine a filtered pixel value by calculating a weighted pixel value based on each of the counts of the pixels in the histogram corresponding to the pixel values included in the list of unique pixel values.

The method 200 includes determining 218 whether a zero-count equals or exceeds a threshold. In particular, in one or more embodiments, the image filtering system tracks a number of zero-counts within the histogram for pixel values represented within the list of unique pixel values. In addition, in one or more embodiments, the image filtering system determines whether the tracked zero-count exceeds a threshold number.

The threshold number of zero-counts may differ under various circumstances. For example, in one or more embodiments, the threshold number of zero-counts depends on a number of potential pixel values within the input image. In particular, in one or more embodiments, the image filtering determines system a threshold number based on a resolution (e.g., color resolution, pixel intensity resolution, grayscale resolution) that identifies or otherwise determines a number of possible pixel values that any given pixel may have. As such, the image filtering system may determine a lower zero-count threshold number for a low-resolution input image having a lower number of possible pixel values than for a high-resolution input image having a higher number of possible pixel values. In one or more embodiments, the image filtering system determines the threshold number of zero-counts based on a percentage of the possible pixel values included within the input image.

As an alternative to considering the total number of possible pixels, in one or more embodiments, the image filtering system determines the threshold number of zero-counts based on a percentage of reference pixel values within the list of unique pixel values having a zero-count. For example, the image filtering system may determine that a zero-count corresponds to 50% or more of the reference pixel values of the list of unique pixel values having a zero-count. As such, where a list of unique pixel values includes one hundred reference pixel values, the image filtering system may set a threshold number of zero-counts to fifty.

If the tracked number of zero-counts equals or exceeds the threshold number of zero-counts for relevant pixel values within the histogram, the method 200 includes reducing 220 the list of unique pixel values. In particular, of the tracked zero-count equals or exceeds the threshold number, the image filtering system reduces the list of unique pixel values by removing reference pixel values from the list of unique pixel values that correspond to zero-counts within the histogram. Alternatively, rather than modifying the existing list of unique pixel values, in one or more embodiments, the image filtering system simply generates a new list of unique pixel values including only those pixel values from the histogram having non-zero counts. As such, in one or more embodiments, the image filtering system generates a clean list of unique pixel values that mirrors or otherwise resembles the pixel values of the histogram having non-zero pixel counts. As shown in FIG. 2, after the image filtering system reduces the list of unique pixel values, the image filtering system proceeds to step 222, which is explained in further detail below.

In addition to filtering the list, in one or more embodiments, the image filtering system further updates the histogram to reflect the filtered list. In particular, where filtering or otherwise reducing the list causes pixel values to have a different location within the list, the image filtering system updates index values within the histogram to reflect locations of the pixel values within the updated list. In addition, where certain pixel values previously represented within the list no longer exist within the filtered list, the image filtering system updates the index values to include negative indicators (e.g., "−1") to indicate that a certain pixel value within the histogram does not exist within the filtered list.

Alternatively, as shown in FIG. 2, if the tracked zero-count does not equal or exceed the threshold, the image filtering system bypasses the step of reducing the list of unique pixel values and instead proceeds to step 222. In particular, as shown in FIG. 2, after reducing the list of unique pixel values or, alternatively, determining that the tracked zero-count does not equal or exceed the threshold, the method 200 further includes determining 222 whether the pixel of interest corresponding to the current location of the kernel window is the last pixel of the input image. For example, the image filtering system determines whether all of the pixels of the input image have been analyzed to determine a filtered pixel value for the filtered output image.

If the image filtering system determines that the pixel of interest is not the last pixel, the image filtering system proceeds to shift 210 the kernel window to the next pixel location and applies the kernel window at the next pixel location, as described above. Alternatively, if the image filtering system determines that the pixel of interest is the last pixel within the input image, the image filtering system ends 224 the method 200. As a result of the method 200, the image filtering system generates a filtered output image including filtered pixels based on neighboring pixels of respective pixels of interest throughout the input image.

Figure 3:
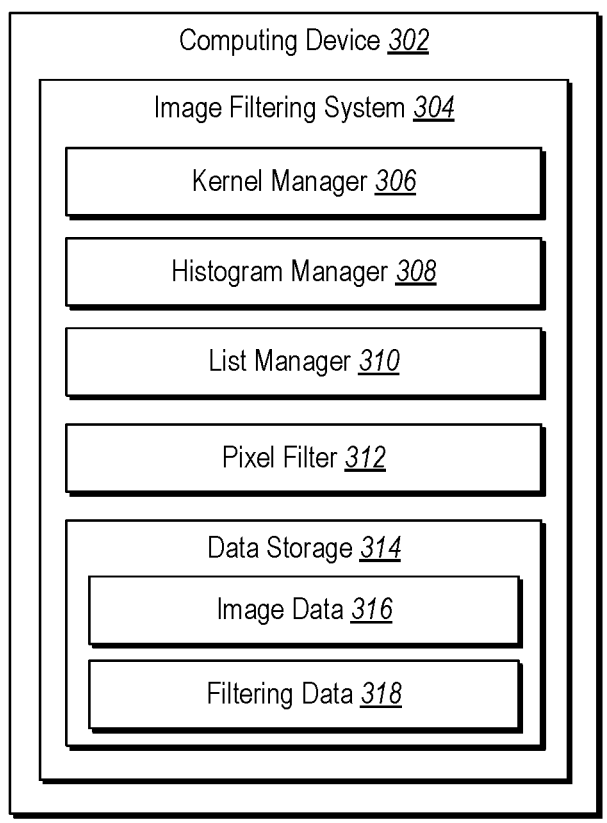
FIG. 3 illustrates a block diagram of a computing device having an image filtering system thereon in accordance with one or more embodiments.

Turning now to FIG. 3, additional detail will be provided regarding a potential architecture for the image filtering system. In particular, FIG. 3 illustrates an example computing device 302 including an image filtering system 304 that performs a filtering process to generate a filtered output image in accordance with one or more embodiments described herein. As shown in FIG. 3, the image filtering system 304 includes a kernel manager 306, a histogram manager 308, a list manager 310, a pixel filter 312, and a data storage 314 including image data 316 and filtering data 318 thereon.

As shown in FIG. 3, the image filtering system 304 includes a kernel manager 306 that applies a kernel window at incremental locations throughout an input image. For example, in one or more embodiments, the kernel manager 306 applies a kernel window (e.g., a filter window) at incremental pixel locations (e.g., pixels of interest) across an entire input image. In one or more embodiments, the kernel manager 306 initiates the kernel window at a first pixel location (e.g., a top-left pixel) and subsequently applies the kernel window pixel-by-pixel until the image filtering system 304 determines a filtered pixel value for each pixel of the input image. As described in one or more embodiments herein, the image filtering system 304 can generate and/or maintain a histogram and list of unique pixel values as well as determine a filtered pixel value for each applied pixel location of the kernel window.

As further shown in FIG. 3, the image filtering system 304 includes a histogram manager 308 that generates and maintains a histogram for the kernel window at each incremental location of the input image. For example, in one or more embodiments, the histogram manager 308 generates or updates a histogram including identified pixel values (e.g., pixel intensity values, gray scale values, color values) in addition to counts of pixels within a current boundary of the kernel window that share one or more of the identified pixel values. In addition, the histogram manager 308 tracks and includes index values indicating the existence and location of pixel values within a list of unique pixel values associated with the histogram. As the kernel manager 306 applies the kernel window at iterative locations, the histogram manager 308 updates the histogram to reflect the current location of the kernel window.

For example, in one or more histogram embodiments, the manager 308 generates a histogram for an initial location of the kernel window. Upon moving the kernel window from a previous location (e.g., the first location) to a current location (e.g., a next location), the histogram manager 308 updates the kernel window by updating counts of values within the histogram. In particular, the histogram manager 308 adds to counts of pixel values for additional pixels that fall within the boundary of the filter window. In addition, the histogram manager 308 subtracts from counts of pixel values for pixels no longer within the boundary of the kernel window. Moreover, the histogram manager 308 updates index values to reflect any new values represented within the list of unique pixel values.

As further shown in FIG. 3, the image filtering system 304 includes a list manager 310 that generates and maintains a list of unique pixel values including reference pixel values corresponding to pixel values that have been identified within a current iteration of the kernel window and/or one or more previous iterations of the kernel window. For example, in one or more embodiments, the list manager 310 generates and updates a list of unique pixel values to include pixel values from a current view of the kernel window and one or more previous view of the kernel window. For example, in one or more embodiments, the list manager 310 generates a list of unique pixel values including all unique pixel values of pixels within an initial iteration of the kernel window. In addition, the list manager 310 updates the list of unique pixel values to include any new pixel values at one or more subsequent iterations of the kernel window (e.g., not represented within one or more previous iterations of the kernel window).

In one or more embodiments, the list manager 310 tracks a number of zero-counts corresponding to counts of zero within the histogram for values of the histogram that are represented within the list of unique pixel values. For example, the list manager 310 identifies any number of the reference pixel values that correspond to zero-counts within the histogram. In one or more embodiments, the list manager 310 tracks the zero-counts by keeping a running tally of zero-counts based on differences between additional pixels and removed pixels caused as a result of applying the kernel window at incremental locations. Alternatively, in one or more embodiments, the list manager 310 queries entries of the histogram for pixel values corresponding to the reference pixel values of the list of unique pixel values to identify the number of zero-counts corresponding to unrepresented reference pixel values within the histogram.

As mentioned above, in one or more embodiments, the list manager 310 periodically filters the list of unique pixel values. For example, in one or more embodiments, the list manager 310 reduces the list of unique pixel values upon determining that the tracked number of zero-counts equals or exceeds a threshold number of zero-counts. For example, if the list manager 310 determines that the tracked number of zero-counts equals or exceeds a threshold number, the list manager 310 removes all values of the list of unique pixel values corresponding to pixel values having a count of zero within the histogram. In other words, the list manager 310 periodically generates a filtered list of unique pixel values including only those reference pixel values corresponding to pixel values having non-zero counts within the histogram.

In addition to filtering the list, the histogram manager 308 further updates the histogram based on new locations of pixel values within the filtered list. For example, as a result of removed pixel values, any number of the index values within the histogram may have a different location within the list. Accordingly, in one or more embodiments, the histogram manager 308 updates the histogram to include new index values representative of a location of pixel values within the filtered list. In addition, the histogram manager 308 updates the histogram by including negative indicators for any pixel values no longer represented within the filtered list.

As further shown in FIG. 3, the image filtering system 304 includes a pixel filter 312 that determines a filtered pixel value for each pixel throughout the input image. In particular, in one or more embodiments, the pixel filter 312 determines a pixel value based on pixel values for pixels within each application of the kernel window. For example, in one or more embodiments, the pixel filter 312 calculates a weighted average using the counts in the histogram corresponding to pixel values in the list of unique pixel values. Where the kernel manager 306 applies the kernel window at each pixel of the input image, the pixel filter 312 can calculate a filtered pixel value for each pixel of the input image. In one or more embodiments, the image filtering system 304 outputs a filtered output image including each of the filtered pixel values determined by the pixel filter 312.

In one or more embodiments, the pixel filter 312 utilizes the list of unique pixel values to consider only those entries of the histogram having corresponding reference pixel values within the list of unique pixel values. For example, rather than considering every possible pixel value contained within the histogram, the pixel filter 312 considers only those entries of the histogram having a value corresponding to the pixel values of the list of unique pixel values. Accordingly, the pixel filter 312 can ignore those pixel values within the histogram known to have zero-counts based on an absence of the corresponding reference pixel value within the list of unique pixel values.

As further shown in FIG. 3, the image filtering system 304 includes a data storage 314 including image data 316 and filtering data 318. The image data 316 includes any data associated with the input image including pixels and corresponding pixel values that make up the input image. The image data 316 can further include resolution information including, for example, possible pixel values that each pixel may have. In addition, the filtering data 318 includes data associated with filtering the input image to generate the output image. For example, the filtering data 318 may include data from the histogram and list of unique pixel values used for determining filtered pixel values at each iteration of the kernel window. In addition, the filtering data 318 can include data for creating the kernel window (e.g., pixel dimensions) as well as threshold information for determining when and how to periodically clean the histogram and/or list of unique pixel values.

Each of the components 306-314 of the image filtering system 304 and corresponding elements may be in communication with one another using any suitable communication technologies. It will be recognized that that although components 306-314 and their corresponding elements are shown to be separate in FIG. 3, any of components 306-314 and their corresponding elements may be combined into fewer components, such as into a single facility or module, divided into more components, or configured into different components as may serve a particular embodiment.

The components 306-314 and their corresponding elements can comprise software, hardware, or both. For example, the components 306-314 and their corresponding elements can comprise one or more instructions stored on a computer-readable storage medium and executable by processors of one or more computing devices. When executed by the one or more processors, the computer-executable instructions of the image filtering system 304 can cause a client device and/or a server device to perform the methods described herein. Alternatively, the components 306-314 and their corresponding elements can comprise hardware, such as a special purpose processing device to perform a certain function or group of functions. Additionally, the components 306-314 and their corresponding elements can comprise a combination of computer-executable instructions and hardware.

Furthermore, one or more of the components 306-314 of the image filtering system 304 may, for example, be implemented as one or more stand-alone applications, as one or more modules of an application, as one or more plug-ins, as one or more library functions or functions that may be called by other applications, and/or as a cloud-computing model. Thus, one or more of the components 306-314 of the image filtering system 304 may be implemented as a stand-alone application, such as a desktop or mobile application. Furthermore, one or more of the components 306-314 of the image filtering system 304 may be implemented as one or more web-based applications hosted on a remote server. Alternatively, or additionally, one or more components 306-314 of the image filtering system 304 may be implemented in a suit of mobile device applications or "apps." To illustrate, one or more of the components of the image filtering system 304 may be implemented in a digital image editing application, including but not limited to ADOBE® PHOTOSHOP® or ADOBE® REVEL®. "ADOBE®," "ADOBE® PHOTOSHOP®," and "ADOBE® REVEL®" are either registered trademarks or trademarks of Adobe Systems Incorporated in the United States and/or other countries.

Figure 4:
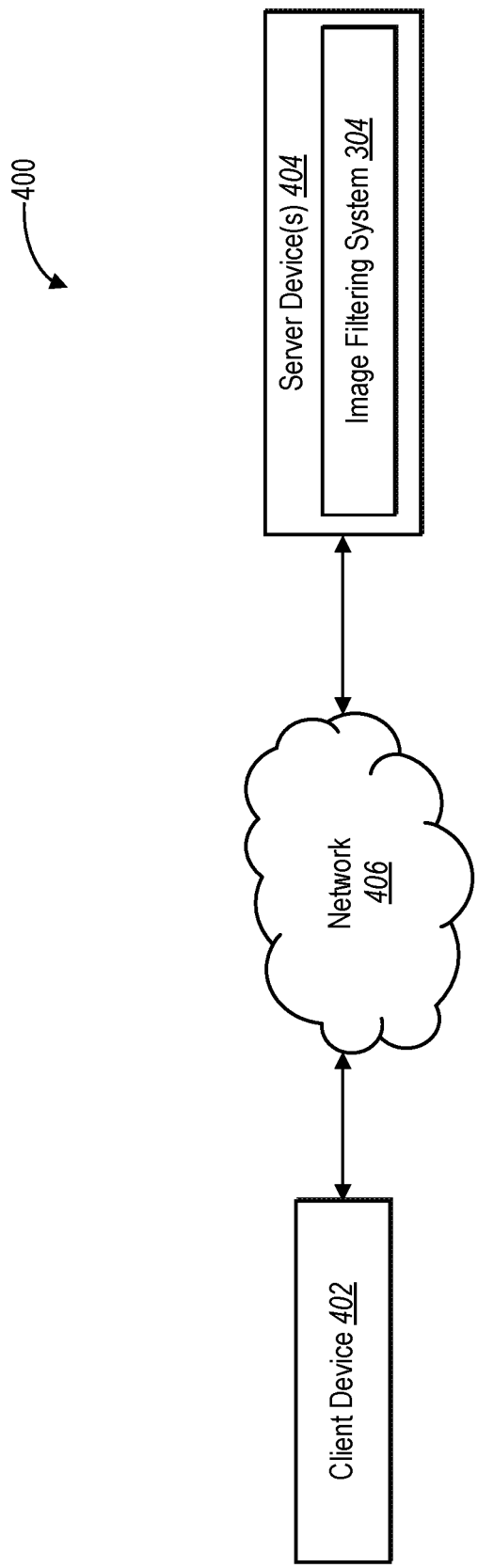
FIG. 4 illustrates a block diagram of an environment in which an image filtering system is implemented in accordance with one or more embodiments.

FIG. 4 illustrates an example filtering environment 400 (or simply "environment 400" for performing the processes and features described herein. For example, as shown in FIG. 4, the environment 400 includes a client device 402 and a server device 404 having an image filtering system 304 implemented thereon. In one or more embodiments, the client device 402 is associated with one or more users. As further shown in FIG. 4, the client device 402 can communicate with the server device 404 over a network 406.

As shown in FIG. 4, the server device 404 includes the image filtering system 304 implemented thereon. In one or more embodiments, the image filtering system 304 causes the server device 404 to perform one or more features and functionality described above in connection with applying a bilateral filter to an input image to generate a filtered output image in accordance with one or more embodiments described herein. For example, the server device 404 can include the image filtering system 304 including components 306-318 described above in connection with FIG. 3. Alternatively, in one or more embodiments, some or all of the image filtering system 304 (or discrete components of the image filtering system 304) can be implemented on the client device 402. For example, in one or more embodiments, the client device 402 includes one or more local applications that facilitate one or more of the features and functionality described herein.

As an example, in one or more embodiments, the client device 402 captures, receives, or otherwise obtains access to a digital image. In one or more embodiments, the client device 402 provides the digital image via one or more digital image editing applications including, but not limited to ADOBE® PHOTOSHOP® or ADOBE® REVEL®. In one or more embodiments, the client device 402 provides access to the digital editing application via a local application on the client device 402 or, alternatively, via a webpage or remote service provided via the image filtering system 304 on the server device 404. Thus, in one or more embodiments, the client device 402 provides an interface whereby a user can interact with the digital image while remotely accessing features and functionality described above in connection with the image filtering system 304.

In one or more embodiments, the client device 402 provides instructions (e.g., via user inputs) to the server device 404 via the network 406 to apply a filter to an input image. In response, the image filtering system 304 generates a filtered digital image in accordance with one or more embodiments described above. For example, in accordance with instructions or user inputs received by the client device 402, the image filtering system 304 analyzes identified pixel values of the input image and generates a filtered output image using intelligent processing of counts of a histogram based on a list of unique pixel values. In one or more embodiments, the image filtering system 304 causes the server device 404 to perform acts and steps described herein. Alternatively, in one or more embodiments, the image filtering system 304 provides instructions that cause the client device 402 to perform acts and steps described herein. Accordingly, in one or more embodiments, the client device 402 and server device 404 cooperatively generate a filtered output image in accordance with one or more embodiments described herein.

FIGS. 1A-4, the corresponding text, and the example, provide a number of different systems and devices that allows the image filtering system 304 to generate a filtered output image in accordance with one or more embodiments described herein. In addition to the foregoing, embodiments can also be described in terms of flowcharts comprising acts and steps in a method for accomplishing a particular result. For example, FIG. 5 illustrates a flowchart of an exemplary method in accordance with one or more embodiments.

Figure 5:
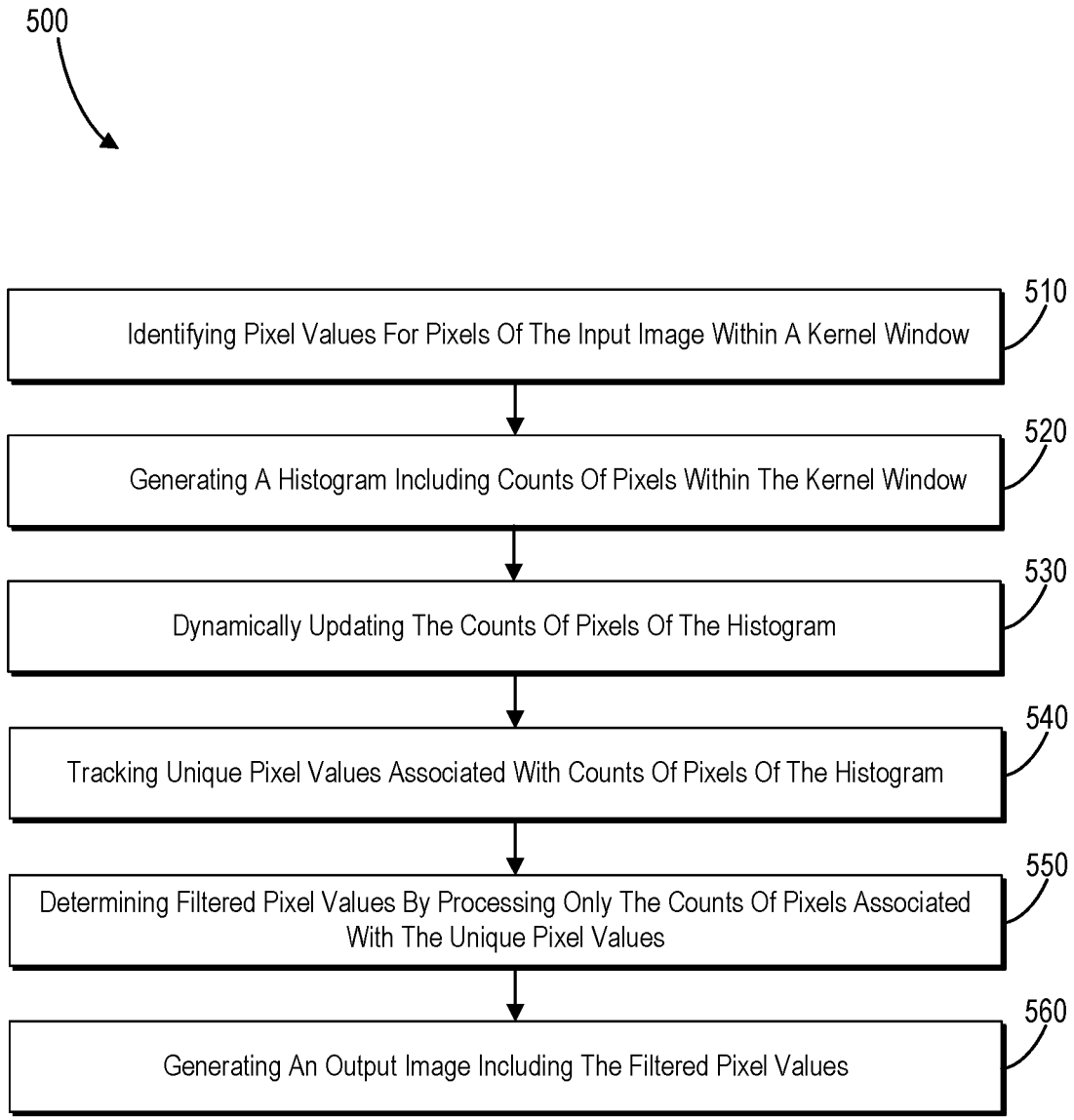
FIG. 5 illustrates a series of acts for filtering an input image in accordance with one or more embodiments.

FIG. 5 illustrates a flowchart of one example method 500 for modifying an input image by applying a bilateral filter. As shown in FIG. 5, the method 500 includes an act 510 of identifying pixel values for pixels 104 of an input image within a kernel window 106. In one or more embodiments, identifying pixel values for pixels 104 of the input image includes identifying a pixel of interest for a location of the kernel window 106. In addition, identifying pixel values for pixels 104 of the input includes identifying pixel values for neighboring pixels to the pixel of interest within a boundary of the kernel window 106. As mentioned above, the input image can include any number of pixels 104 having any possible number of pixel values. In addition, the pixel values of the input image can refer to various types of values (e.g., pixel intensity, color, grayscale).

As further shown in FIG. 5, the method 500 includes an act 520 of generating a histogram 110 including counts of pixels 104 within the kernel window 106. For example, in one or more embodiments, the act 520 includes generating a histogram 110 including a count of pixels 104 within the kernel window 106 for each pixel value. In one or more embodiments, generating the histogram 110 includes associating a bucket with each pixel value and adding a count to a given bucket for each pixel 104 within the kernel window 106 having a pixel value associated with the given bucket. In one or more embodiments, associating a bucket with each pixel value includes associating a range of pixel values with each bucket. In addition, in one or more embodiments, adding a count to a given bucket for each pixel 104 within the kernel window 106 having a pixel value associated with the given bucket includes adding a count to the given bucket for each pixel 104 within the kernel window 106 having a pixel value within the range of pixel values associated with the given bucket. In addition, in one or more embodiments, associating a bucket with each pixel value includes associating a bucket with each pixel value as a given pixel value is identified within the kernel window 106.

Furthermore, in one or more embodiments, generating the histogram 110 further includes generating a histogram including index values for each pixel value within the histogram 110. For example, in one or more embodiments, generating the histogram includes generating an index value indicating a location within a list that a corresponding pixel value can be found. Alternatively, where a pixel value is not found within the list, generating the index value may include generating a negative indicator for the associated pixel value within the histogram 110.

As further shown in FIG. 5, the method 500 includes an act 530 of dynamically updating the counts of pixels 104 of the histogram 106. For example, in one or more embodiments, the act 530 includes dynamically updating the counts of pixels 104 of the histogram 110 as the kernel window 106 is moved about the input image. In one or more embodiments, dynamically updating the counts of pixels 104 of the histogram 110 includes adding to the counts of pixels within the histogram 110 for pixels 104 in an area added to the kernel window 106 as a result of the kernel window 106 moving from a first location to a second location. In addition, in one or more embodiments, dynamically updating the counts of pixels 104 of the histogram 110 includes subtracting from the kernel window 106 as a result of the kernel window 106 moving from the first location to the second location.

In one or more embodiments, the method 500 includes a step for determining filtered pixel values for each location of the kernel window 106 by processing only counts of pixels of the histogram 110 having or having had a non-zero count. For example, in one or more embodiments, the method 500 includes determining filtered pixel values based solely on counts of the histogram 110 represented within a list of unique pixel values while discarding or otherwise not considering counts of the histogram 110 that are not represented within the list of unique pixel values.

As shown in FIG. 5, the method 500 includes an act 540 of tracking unique pixel values associated with counts of pixels 104 within the histogram 110. For example, in one or more embodiments, the act 540 includes tracking unique pixel values associated with counts of pixels of the histogram 110 and maintaining a list 116 of the unique pixel values. In one or more embodiments, tracking unique pixel values includes tracking pixel values for which counts are added to the histogram 110.

In one or more embodiments, the method 500 includes tracking pixel values with an associated count that is reduced to zero in the histogram 110. In one or more embodiments, the method 500 further includes removing one or more pixel values form the list 116 corresponding to the pixel values with an associated count that is reduced to zero. For example, in one or more embodiments, removing unique pixel values from the list 116 includes determining that the tracked number of pixel values with an associated count that is reduced to zero exceeds a threshold. Further, in one or more embodiments, removing unique pixel values from the list 116 includes removing the one or more unique pixel values based on determining that the tracked number of pixel values with an associated count that is reduced to zero exceeds the threshold. In one or more embodiments, removing one or more unique pixel values from the list 116 includes removing any of the unique pixel values corresponding to zero-counts within the histogram 110 for a given location of the kernel window 106. In addition, in one or more embodiments, the method 500 includes updating index values of the histogram 110 to correspond to new locations of the unique pixel values from the list 116. Further, in one or more embodiments, the method 500 includes updating index values of the histogram 110 to reflect any pixel values removed from the list 116.

As further shown in FIG. 5, the method 500 includes an act 550 of determining filtered pixel values by processing only the counts of pixels 104 associated with the unique pixel values. For example, in one or more embodiments, the act 550 includes determining filtered pixel values by processing only the counts of pixels of the histogram 110 associated with the unique pixel values in the list 116. For example, in one or more embodiments, determining filtered pixel values includes calculated a weighted average of pixel values for a number of identified pixels 104 within the kernel window 104.

As further shown in FIG. 5, the method 500 includes an act 560 of generating an output image including the filtered pixel values. For example, in one or more embodiments, the act 560 includes generating an output image includes filtered pixel values for each respective location of the kernel window 106. In one or more embodiments, generating the output image including the filtered pixel values includes generating a bilaterally filtered image.

In one or more embodiments, the method 500 further includes truncating the pixel values to effectively reduce the total number of possible values. For example, in one or more embodiments, the method 500 includes truncating the pixel values from a range of possible pixel values associated with the input image to include fewer possible pixel values. Upon truncating the pixel values, in one or more embodiments, the method 500 includes generating and maintaining the histogram 110 including the truncated pixel values.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
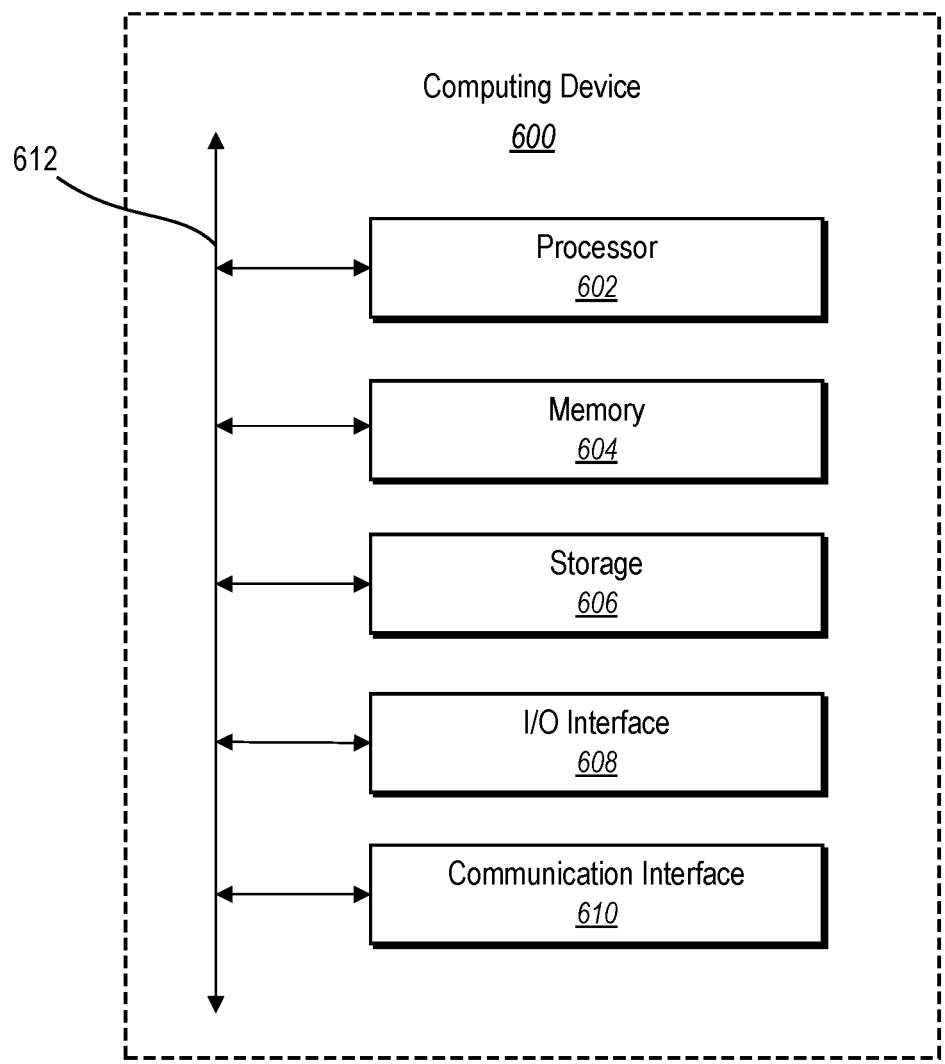
FIG. 6 illustrates a block diagram of an exemplary computing device in accordance with one or more embodiments.

FIG. 6 illustrates a block diagram of exemplary computing device 600 that may be configured to perform one or more of the processes described above. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for digitizing real-world objects, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions related to object digitizing processes (e.g., digital scans, digital models).

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers.

In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for modifying digital images by applying filters, a method of generating filtered digital images comprising:
   identifying pixel values for pixels of an input image within a kernel window;
   generating a histogram comprising a count of pixels within the kernel window for each pixel value;

dynamically updating counts of pixels of the histogram as the kernel window is moved about the input image;

tracking, based on the counts of the pixels of the histogram, unique pixel values associated with the counts of the histogram;

maintaining, as the kernel window is moved about the input image, a list of the unique pixel values, the list comprising a single instance for each of the unique pixel values by:
  adding new unique pixel values to the list as the kernel window is moved about the input image;
  updating counts for the unique pixel values in the list to reflect pixel values within the kernel window at different kernel window locations as the kernel window is moved about the input image;
  determining that a number of the unique pixel values with a zero count within the list exceeds a threshold; and
  based on determining that the number of the unique pixel values with a zero count within the list exceeds the threshold, updating the list by removing unique pixel values with a zero count;
  determining filtered pixel values by processing the counts of pixels of the histogram associated with the unique pixel values in the list and with zero counts up to the threshold; and
  generating an output image comprising the filtered pixel values.

2. The method as recited in claim 1, wherein tracking unique pixel values associated with counts within the histogram comprises tracking pixel values for which counts are added to the histogram.

3. The method of claim 2, further comprising:
tracking pixel values with an associated count that is reduced to zero in the histogram; and
removing one or more unique pixel values from the list corresponding to the pixel values with an associated count that is reduced to zero.

4. The method of claim 1, wherein determining that a number of the unique pixel values with a zero count within the list exceeds a threshold comprises determining four zero counts for the number of the unique pixel values.

5. The method of claim 1, wherein removing unique pixel values from the list comprises removing any of the unique pixel values corresponding to zero- counts within the histogram for a given location of the kernel window.

6. The method as recited in claim 1, wherein generating the output image comprising the filtered pixel values comprises generating a bilaterally filtered image.

7. The method as recited in claim 1, wherein identifying pixel values for pixels of the input image within the kernel window comprises:
  identifying a pixel of interest for a location of the kernel window; and
  identifying pixel values for neighboring pixels to the pixel of interest within a boundary of the kernel window.

8. The method as recited in claim 1, wherein generating the histogram comprising the count of pixels within the kernel window for each pixel value comprises:
  associating a bucket with each pixel value; and
  adding a count to a given bucket for each pixel within the kernel window having a pixel value associated with the given bucket.

9. The method as recited in claim 8, wherein:
associating a bucket with each pixel value comprises associating a range of pixel values with each bucket; and
adding a count to a given bucket for each pixel within the kernel window having a pixel value associated with the given bucket comprises adding a count to the given bucket for each pixel within the kernel window having a pixel value within the range of pixel values associated with the given bucket.

10. The method as recited in claim 8, wherein: associating a bucket with each pixel value comprises associating a bucket with each pixel value as a given pixel value is within the kernel window.

11. The method as recited in claim 1, wherein dynamically updating the counts of pixels of the histogram as the kernel window is moved about the input image comprises:
  adding to the counts of pixels within the histogram for pixels in an area added to the kernel window as a result of the kernel window moving from a first location to a second location; and
  subtracting from the counts of pixels within the histogram for pixels in an area removed from the kernel window as a result of the kernel window moving from the first location to the second location.

12. The method of claim 1, further comprising truncating the pixel values to effectively reduce a total number of possible pixel values.

13. A system for modifying digital images, the system comprising:
  at least one processor; and
  a non-transitory storage medium comprising instructions thereon that, when executed by the at least one processor, cause the system to:
    identify pixel values for pixels of an input image within a kernel window;
    generate a histogram comprising a count of pixels within the kernel window for each pixel value;
    dynamically update counts of pixels of the histogram as the kernel window is moved about the input image, wherein updating counts of pixels of the histogram for a given location of the kernel window comprises adding and subtracting counts of pixels of the histogram to reflect identified pixel values within the kernel window at the given location;
    maintain, as the kernel window is moved about the input image, a list of unique pixel values for the histogram, the list comprising a single instance of each unique pixel value by:
      adding new unique pixel values to the list as the kernel window is moved about the input image;
      updating counts for the unique pixel values in the list to reflect pixel values within the kernel window at different kernel window locations as the kernel window is moved about the input image;
      determining that a number of the unique pixel values with a zero count within the list exceeds a threshold; and
      based on determining that the number of the unique pixel values with a zero count within the list exceeds the threshold, updating the list by removing unique pixel values with a zero count;
    determine, for each location of the kernel window, a filtered pixel value comprising a weighted average of pixel values by processing the counts of pixels in the histogram associated with the unique pixel values in the list and with zero counts up to the threshold; and
    generate an output image comprising filtered pixel values for each respective location of the kernel window.

14. The system of claim 13, further comprising instructions, that when executed by the at least one processor, cause the system to generate the output image comprising the filtered pixel values by generating a bilaterally filtered image.

15. A non-transitory computer readable medium comprising instructions that, when executed by at least one processor, cause a computing device to:
- identify pixel values for pixels of an input image within a kernel window;
- generate a histogram comprising a count of pixels within the kernel window for each pixel value;
- dynamically update counts of pixels of the histogram as the kernel window is moved about the input image;
- track, based on the counts of the pixels of the histogram, unique pixel values associated with the counts of the histogram;
- maintain, as the kernel window is moved about the input image, a list of the unique pixel values, the list comprising a single instance for each of the unique pixel values by:
  - adding new unique pixel values to the list as the kernel window is moved about the input image;
  - updating counts for the unique pixel values in the list to reflect pixel values within the kernel window at different kernel window locations as the kernel window is moved about the input image;
  - determining that a number of the unique pixel values with a zero count within the list exceeds a threshold; and
  - based on determining that the number of the unique pixel values with a zero count within the list exceeds the threshold, updating the list by removing unique pixel values with a zero count;
- determine filtered pixel values by processing the counts of pixels of the histogram associated with the unique pixel values in the list and with zero counts up to the threshold; and
- generate an output image comprising the filtered pixel values.

16. The non-transitory computer readable medium of claim 15, further comprising instructions that, when executed by the at least one processor, cause the computing device to track unique pixel values associated with counts within the histogram by tracking pixel values for which counts are added to the histogram.

17. The non-transitory computer readable medium of claim 16, further comprising instructions that, when executed by the at least one processor, cause the computing device to:
- track pixel values with an associated count that is reduced to zero in the histogram; and
- remove one or more unique pixel values from the list corresponding to the pixel values with an associated count that is reduced to zero.

18. The non-transitory computer readable medium of claim 15, further comprising instructions that, when executed by the at least one processor, cause the computing device to identify pixel values for pixels of the input image within the kernel window
- identifying a pixel of interest for a location of the kernel window; and
- identifying pixel values for neighboring pixels to the pixel of interest within a boundary of the kernel window.

19. The non-transitory computer readable medium of claim 15, further comprising instructions that, when executed by the at least one processor, cause the computing device to remove unique pixel values from the list by removing any of the unique pixel values corresponding to zero-counts within the histogram for a given location of the kernel window.

20. The non-transitory computer readable medium of claim 15, further comprising instructions that, when executed by the at least one processor, cause the computing device to generate the output image comprising the filtered pixel values by generating a bilaterally filtered image.

* * * * *